United States Patent [19]

Kreuzer

[11] Patent Number: 4,993,683
[45] Date of Patent: Feb. 19, 1991

[54] OVERHEAD SUPPORT FOR MEDICAL APPLIANCES

[75] Inventor: Friedhelm Kreuzer, Puchheim, Fed. Rep. of Germany

[73] Assignee: F. M. K. Kreuzer GmbH & Co. KG, Fed. Rep. of Germany

[21] Appl. No.: 287,858

[22] Filed: Dec. 20, 1988

[30] Foreign Application Priority Data

Dec. 23, 1987 [DE] Fed. Rep. of Germany ... 8716928[U]

[51] Int. Cl.$^5$ .............................. F16M 13/00
[52] U.S. Cl. .................. 248/639; 248/669; 248/327; 414/626; 414/669
[58] Field of Search ............ 248/637, 639, 651, 660, 248/669, 122, 124, 415, 296, 317, 320, 323, 324, 327, 333, 125; 414/589, 590, 626, 669, 670, 672, 744.3; 269/57, 71, 74; 254/104

[56] References Cited

U.S. PATENT DOCUMENTS

| | | | |
|---|---|---|---|
| 488,608 | 12/1892 | Hotchkiss | 248/296 |
| 2,663,929 | 12/1953 | Carpenter | 414/672 |
| 2,991,966 | 7/1961 | Varel | 248/669 |
| 3,269,681 | 8/1966 | Azim | 248/124 |
| 3,464,655 | 9/1969 | Schuman | 248/651 |
| 3,556,455 | 1/1971 | Storm | 248/333 |
| 3,599,922 | 8/1971 | Junginger | 248/333 |
| 3,627,250 | 12/1971 | Pegrum | 248/324 |
| 4,234,155 | 11/1980 | Destree | 248/651 |
| 4,599,034 | 7/1986 | Kennedy | 269/71 |
| 4,673,154 | 6/1987 | Karapita | 248/320 |
| 4,759,684 | 7/1988 | Lanzillotta | 414/590 |

FOREIGN PATENT DOCUMENTS

| | | | |
|---|---|---|---|
| 129216 | 8/1950 | Sweden | 248/124 |
| 630472 | 10/1949 | United Kingdom | 248/669 |

Primary Examiner—Ramon O. Ramirez
Assistant Examiner—Robert A. Olson
Attorney, Agent, or Firm—Donald Brown

[57] ABSTRACT

An overhead support for receiving medical appliances comprises an extension arm and appliance receiving means and is modified for receiving various chassis-mounted appliances on said appliance receiving means. To this end the appliance receiving means is level-adjustable such that it receives a medical appliance carried on a chassis by grabbing the chassis from below.

1 Claim, 1 Drawing Sheet

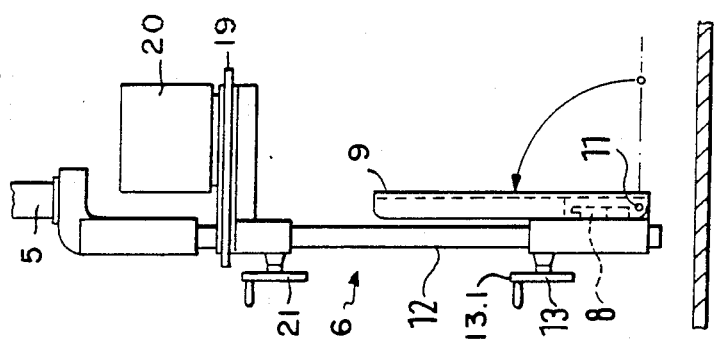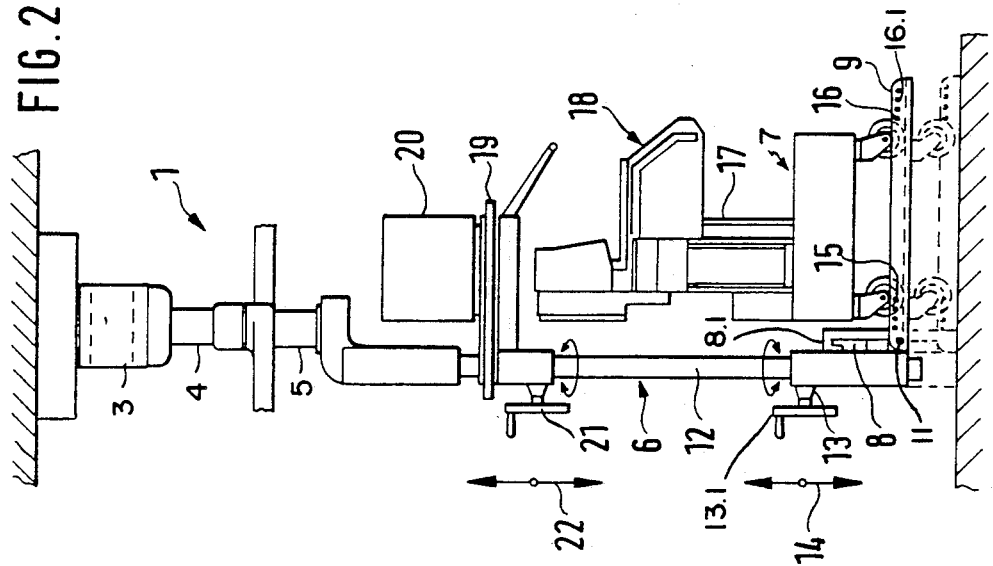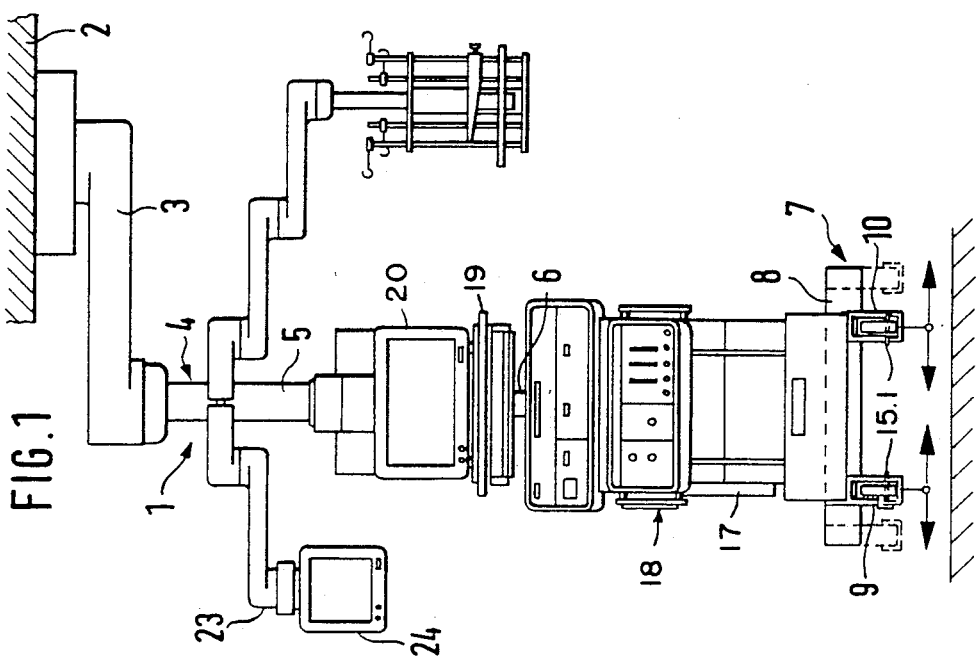

OVERHEAD SUPPORT FOR MEDICAL APPLIANCES

BACKGROUND OF THE INVENTION

The invention relates to an overhead support for carrying medical appliances. Such an overhead support comprises an extension arm, a column with supply lines passed therethrough and a first appliance carrying means.

Such supports are in particular used in operation rooms or hospitals. A central column carries devices such as a monitor or keyboards which are adjusted to a particular operationial level and, in case of monitors, to a defined inclination angle for the operators. If desired, further swivel arms may be provided which are fixedly connected with the central column. These may eventually carry monitors which have their rotational position and their inclination relative to the horizontal adjusted in correspondence to the working position. It is desired that an anaesthetic appliance may be supported at the column and can be detached from the column and moved to other places. Since such anaesthetic appliances are too heavy to be carried, a known overhead support comprises some kind of fork at the lower end of the extension arm column. In the bottom of the anaesthetic appliance to be supported there are recesses provided which correspond to the fork. The anaesthetic appliance is placed on the fork and carried by the support in this manner. For placing and removing, resp., of the anaesthetic appliance there is a lifting truck which is adjustable in height, such that it receives the anaesthetic appliance and lifts it off from the fork, whereupon the appliance may be drawn off from the fork by means of the lifting truck. It is a drawback of this solution that only particularly adapted appliances, in particular without fixed chassis may be received. Since the major amount of practically used anaesthetic appliances comprise a chassis fixedly connected thereto, the known overhead support is not suitable for the use thereof.

OBJECTS OF THE INVENTION

It is an object of the invention to provide an improved overhead support for medical appliances, in which the above-mentioned drawbacks are avoided. It is a further object to provide an overhead support of the above described kind which is suitable for receiving various medical appliances and in particular anaesthetic appliances and patient monitoring appliances, in particular having a chassis. It is a still further object of the invention to design the overhead support such that it allows, on the one hand, to retain appliances, such as monitors or the like, in a predetermined elevation and, on the other hand, the removal of an appliance, such as an anaesthetic appliance mounted on a haulage car, which has to be moved to another place. When supported by the overhead support, the appliance to be eventually transported shall be lifted to provide ground clearance for sufficient leg room.

SUMMARY OF THE INVENTION

According to the invention an overhead support for carrying medical appliances comprises an extension arm, a column with supply lines passed therethrough, appliance receiving means and means for adjusting the level of the appliance receiving means for enabling the appliance receiving means to receive a medical appliance on a chassis by grabbing the chassis from below.

BRIEF DESCRIPTION OF THE DRAWINGS

Further advantages, features and objects of the invention will stand out from the following description of an exemplary embodiment with reference to the drawings. In the drawings FIG. 1 is a front view of the overhead support according to the invention with supported anaesthetic appliance;

FIG. 2 is a side view of the overhead support according to the invention with supported anaesthetic appliance, in which the lowered position is shown in dotted lines and the lifted position in full lines;

FIG. 3 is a part view of the overhead support shown as a side view in FIG. 2 with folded-up rails.

DESCRIPTION OF PREFERRED EMBODIMENTS

The overhead support 1 comprises an extension arm 3 for attachment at a ceiling 2 through a joint, and a column 4 hingedly connected with the extension arm. The column 4 comprises a first portion 5 connected with the extension arm 3, and a second portion 6. At the bottomside end of the second portion 6 there is an appliance receiving means 7 which comprises at the lower end thereof a yoke 8 extending transversely to the vertical second portion. As may be in particular seen from FIGS. 2 and 3, a pair of rails 9, 10 is provided at the yoke and extends in horizontal direction when in operational position. The yoke is connected with the rails through a respective hinge 11 such that the rails may be folded up in rest position in the manner shown in FIG. 3.

In the present embodiment the second portion 6 comprises a rack 12 and a spindle 13 supporting the yoke. By operating the spindle the appliance receiving means may be lifted and lowered in direction of the arrow 14 between the operation position shown in FIG. 2 in full lines and the lowered position shown in dotted lines. The level adjustment is advantageously performed by means of a crank handle which makes contact banks or similar safety devices superfluous. In place of the hand-operated level adjustment mechanism, however, the level adjustment may alternatively be performed by means of a motor drive.

By means of a guide mechanism provided at the yoke 8 and schematically sketched in FIG. 1, the rails 9, 10 are extendable and retractable in horizontal direction towards and away from, resp., each other in such a manner that the distance between both rails can be varied between a narrow position shown in full lines in FIG. 1 to a wide position shown in dotted lines, as indicated by the arrows in FIG. 1. It is thus possible to adapt the distance between the rails to appliances having various reel distances of haulage cars.

The rails comprise, at their side facing the yoke as well as the side of the free end, a plurality of bores 15, 16 having a respective distance from each other in direction of the rail for receiving locking pins 15.1, 16.9 extending transversely across the respective rail and thereby block the movement of a carriage 17 standing on the rails together with the appliance 18 supported by the carriage. The pins 15.1, 16.1 inserted into said bores 15, 16 serve as depth stops or as locking means, respectively.

At an elevation above an anaesthetic appliance in the operational position thereof a first monitor support 19 for supporting a first monitor 20 is provided. The level of the monitor support is adjustable on the rack 12 in direction of the arrow 22 independently of the level of the appliance receiving means 7 through a respective spindle 21. The appliance receiving means 7 as well as the first monitor support are pivotable around the axis of the column in the manner indicated by the arrows shown in FIG. 2. The overhead support carries a second monitor support 23 which is mounted to the first portion 5 of the column in a manner to be fixed with respect to the axial direction of the column. Alternatively the first monitor support 19 may also be connected with the first portion 5 of the column.

In operation the inclination of both monitors 20 and 24 is adjusted relative to the work place. The anaesthetic appliance 18 together with the carriage 17 is stationarily locked on the rails 9, 10 with the aid of the locking pins 15.1, 16.1 and lifted upwards by means of the spindle 13 to obtain ground clearance such that the anaesthetic appliance can be pivoted around the axis of the second portion. The anaesthetic appliance is connected with (not shown) supply lines passed through the stationary first portion of the column.

Whenever the anaesthetic appliance shall be moved to another place, the appliance receiving means is lowered into the position shown in dotted lines in FIG. 2. Then the appliance together with the carriage is moved away. If desired, the same or a different appliance can again be moved onto the rails at any time. If the carriage of a different appliance has a different wheel distance, the rails are laterally displaced relative to each other for adaptation to the respective wheel distance. After reception the carriage is again lifted up into the position shown in full lines. If no carriage is received, the rails are folded up into the position shown in FIG. 3. It is not necessary to change the level or elevation of the remaining devices, neither when removing an appliance nor when receiving a new appliance. This is an essential advantage, since it allows to avoid any readjustment of the inclination of the monitors which once had been properly adjusted for the working place.

Although the invention has been described with reference to a specific example embodiment, it is to be understood that it is intended to cover all modifications an equivalents within the scope of the appended claims.

What is claimed is:

1. An overhead support for carrying medical appliances, comprising an extension arm, a column with supply lines passed therethrough, appliance receiving means being provided at the bottom end of said column and being formed to grab a medical appliance supported on a carriage from below said carriage, means for lifting said carriage off the floor and for adjusting the level of said appliance receiving means to receive said medical appliance, said appliance receiving means comprises two rails and means for adjusting the distance between said two rails, and a hinge provided at the column end for folding said rails up around said hinge.

* * * * *